United States Patent Office 2,743,268
Patented Apr. 24, 1956

2,743,268

ERYTHROMYCIN-PENICILLIN

Mary A. Stieff, Indianapolis, Ind., assignor to Eli Lilly and Company, Indianapolis, Ind., a corporation of Indiana No Drawing. Application July 12, 1952,
Serial No. 298,621

2 Claims. (Cl. 260—210)

This invention relates to novel reaction compounds of erythromycin and penicillin, having both antibiotic properties characteristic of erythromycin and antibiotic properties characteristic of penicillin, and to processes of preparing such compounds.

Erythromycin is an antibiotic produced by the growth of an actinomycete, particularly Streptomyces erythreus, strain M5-12559, in a culture medium containing assimilable sources of carbohydrate, nitrogen, and inorganic salts. Its properties and methods for its preparation are more fully disclosed in the co-pending application of Robert L. Bunch and James M. McGuire, Serial No. 282,246, filed April 14, 1952, now U. S. Patent 2,653,899. It is also described in an article entitled "Ilotycin," * a new antibiotic (*trademark for erythromycin, Lilly), by McGuire et al. appearing in Antibiotics and Chemotherapy, vol. 2, No. 6, page 281, June 1952.

Erythromycin is itself basic in character, and forms acid addition salts. Erythromycin and its acid addition salts are characterized by a broad antibacterial spectrum. They possess antibiotic activity against many microorganisms, both gram-positive and gram-negative. A further important antibiotic property of these compounds is their ability to inhibit the growth and development of certain of the rickettsial bodies and large viruses, for example, epidemic typhus, an meningo-pneumonitis, and to inhibit effectively the growth and development of some of the spirochetes.

Erythromycin crystallizes in white needles which melt with prior softening at about 136-40° C. on a Köfler micromelting point block. It is soluble to the extent of about 2 mg. per ml. in water, and is very soluble in alcohol, acetone, chloroform, acetonitrile, and ethyl acetate. It is moderately soluble in ether, ethylene dichloride and amyl acetate. An electrometric titration in dimethylformamide-water solution (2:1, parts by volume) reveals the presence of one titratable group of pKa'=8.8. The molecular weight as determined by the titration data appears to be about 725. Elemental analysis of erythromycin indicates that it contains: Carbon, 60.40 percent; hydrogen, 9.26 percent; nitrogen, 2.07 percent; oxygen (by difference), 28.27 percent.

The new compounds of this invention are reaction products of erythromycin and penicillin, for example, erythromycin-penicillin G. Since erythromycin in free state is basic in character and the penicillins in free state are acidic in character, the new compounds can be considered to be salts and will be so referred to herein. However, the reaction between the erythromycin and the penicillin may be more complex than a simple salt-forming reaction and the resulting product may involve more than a simple salt-type bond.

The physical and chemical characteristics of erythromycin indicate that it contains a reactive dimethylamino group, and on the assumption that the new erythromycin-penicillin compound is a salt it is believed that it is this dimethylamino group of the erythromycin which reacts with the acidic group of the penicillin to form the salt.

Penicillin has heretofore been found to occur in various forms, designated as penicillin F, dihydro F, G, O, X and K, inter alia. All of these types of penicillin have the same basic nucleus, modified by variation in a side chain. All of the various types of penicillin are characterized by the presence therein of an acidic group, and it is this acidic group which is believed to be the reactive group in the formation of the new compounds of this invention. Thus, for purposes of this invention, unless otherwise indicated, the term "penicillin" is intended to designate any of the known types of penicillin.

The new erythromycin-penicillin salts are prepared by reaction of erythromycin base and penicillin acid or of their simple salts, in solution, either organic-solvent solution or aqueous solution. For preparation of the new compounds in organic-solvent solution, a solution of acid penicillin, for example, in ether, can be mixed with a solution of erythromycin base in the same solvent or in a solvent miscible therewith. The solvent used is conveniently one in which the erythromycin base and the penicillin acid are both soluble but in which the reaction product is relatively less soluble, such as ether, in which case the erythromycin-penicillin salt usually precipitates as a solid. The solid precipitate is recovered, and can be purified by crystallization procedures, for example, by taking the solid precipitate up in a small quantity of acetone and adding several volumes of water. Solvents in which the erythromycin-penicillin salt is soluble can also be used as reaction solvents, in which case the salt is recovered by evaporating off the solvent, and purifying the residue by crystallization procedures.

For the preparation of the new compound in aqueous solution, an erythromycin salt and a penicillin salt can be metathetically reacted in water. Conveniently, the salts used are relatively water-soluble salts, for example, the hydrochloride or the acetate salts of erythromycin and the sodium or potassium salts of penicillin. The order of addition is not critical, and it is only necessary to bring the two salts together in aqueous solution. Erythromycin-penicillin salts are relatively insoluble in water and with reasonable concentrations of reactants the desired salt usually precipitates in solid state from the aqueous reaction mixture. Precipitation may be aided in usual ways, as by scratching, seeding, cooling, etc.

Assay of the new ethythromycin-penicillin salt for erythromycin antibiotic activity and for penicillin antibiotic activity shows the presence of both in the compound. The antibacterial spectra of erythromycin and of penicillin overlap, so that assays involving antibiotic activity against an organism, such as Staphylococcus aureus, which is susceptible to both antibiotics, will indicate the combined potency of both antibiotics. Separate potencies can be obtained by chemical assays and by bacterial assays of effectiveness against organisms susceptible to one antibiotic but not to the other. For example, erythromycin is markedly effective against Mycobacterium tuberculosis whereas penicillin has little or no effectiveness against this organism.

Several assay procedures have been used:

a.—Turbidimetric microbiological assay.—Suitable dilutions of an antibiotic sample are mixed with a nutrient broth and inoculated with a test organism known to be susceptible to the antibiotic, such as Staphylococcus aureus or Mycobacterium tuberculosis. The mixtures are incubated for a predetermined time; a turbidimetric examination is then made to determine the effect of the antibiotic sample in inhibiting the growth of the test organism, and the potency of the sample is measured by comparison with known standards. This test, applied to an erythromycin-penicillin salt sample, gives the total antibiotic activity against the test organism. A corresponding sample, treated with penicillinase to destroy the penicillin, can be tested to determine its antibiotic activity due to the erythromycin. The difference between the total activity and the erythromycin activity can be attributed to the penicillin. Such microbiological assays of erythromycin-penicillin salt show both erythromycin antibiotic activity and penicillin antibiotic activity.

b.—*Chemical test for penicillin.*—The antibiotic sample is treated with hydroxylamine, which reacts with penicillin present to form hydroxamic acid; the resulting mixture is treated with ferric ion which forms a color with the hydroxamic acid, and the potency is determined colorimetrically. This test shows the presence of penicillin activity in erythromycin-penicillin salts.

c.—*Iodometric assay for penicillin.*—This is an official (U. S. P.) test for penicillin. Desirably, in applying it to erythromycin-penicillin salts, a comparative run is made with erythromycin alone, and the results with the salt are corrected by a factor based on the results with the erythromycin alone. This test shows the presence of penicillin activity in erythromycin-penicillin salts.

d.—*Chemical test for erythromycin.*—The antibiotic sample is treated with caustic to hydrolize the erythromycin, and the erythromycin potency of the sample is shown by ultraviolet absorption measurement of the treated mixture. This chemical test shows the presence of erythromycin potency in erythromycin-penicillin salts.

The following are examples of the preparation of the new erythromycin-penicillin salts.

*Example I*

A water solution containing 5 gms. of potassium penicillin-G (about 8,000,000 units of penicillin), was acidified with 10 percent sulfuric acid to about pH 2.0 and extracted with 50 ml. of ether, to obtain an ether solution of acid penicillin-G. To 20 ml. of this ether extract there was added a solution of 4.2 gms. of erythromycin base in 125 ml. of ether. The erythromycin base used was substantially pure and contained 950 mcg. (micrograms) of erythromycin per mg. Upon this mixing, a white amorphous precipitate formed immediately. This white amorphous precipitate was recovered by filtration and dried under vacuum at 45° C. The dried material contained 4.1 percent moisture as determined by the K. Fischer method. Its solubility in various solvents was found to be as indicated in the following table:

| Solvent | Solubility, mg./ml. |
| --- | --- |
| Acetone | more than 100. |
| Methyl alcohol | Do. |
| Ethyl alcohol | Do. |
| Butanol | Do. |
| Chloroform | Do. |
| Amyl acetate | about 33. |
| Water | about 10. |
| Benzene | less than 1. |
| Petroleum ether | Do. |
| Ether | Do. |

Erythromycin-penicillin-G salt prepared in accordance with this example was assayed by the test set forth above and gave the following results.

a. Turbidimetric test against *Staphylococcus aureus*, using erythromycin standard, showed 792 mcg. of erythromycin per mg.

b. Chemical test for penicillin showed 460 units of penicillin per mg.

c. Iodometric test for penicillin showed 500 units of penicillin per mg.

d. Chemical test for erythromycin showed 822 mcg. of erythromycin per mg.

A 1 mg./ml. solution in acetone of erythromycin-penicillin-G salt of this example was also assayed by agar dilution test procedure and showed 10,000–20,000 agar dilution units of activity against *Staphylococcus aureus* and about 2,000 agar dilution units of activity against *Mycobacterium tuberculosis*.

*Example II*

A water solution of 5 g. of potassium penicillin-G was acidified with 10 percent sulfuric acid to pH 2.2 and extracted with 50 ml. of ether. To the ether extract there was added 11.35 g. of erythromycin base dissolved in 400 ml. of ether. A white amorphous precipitate of erythromycin-penicillin-G salt formed, and this was recovered by filtration, and dried for about forty-eight hours under conditions of low humidity at about 65° C. The dried salt weighed about 13.2 g., and contained about 4.5 percent moisture as determined by the K. Fischer procedure.

The dried salt was dissolved in a small amount of acetone and approximately five volumes of water were added. A crystalline precipitate formed, and this was recovered by filtration and dried.

The crystalline erythromycin-penicillin-G salt was assayed by test procedures as set forth above, with the following results:

a. Turbidimetric assay against *Staphylococcus aureus*, using erythromycin standard, showed 588 mcg. of erythromycin per mg.

b. Chemical test for penicillin showed 334 units of penicillin per mg.

c. Iodometric assay for penicillin showed 437 units of penicillin per mg.

d. Chemical test for erythromycin showed 520 mcg. of erythromycin per mg.

*Example III*

To a solution of 2 gms. of erythromycin hydrochloride (1,660,000 mcg. erythromycin) in 60 ml. of water there was added 0.932 gms. of dry crystalline potassium penicillin-G, and the mixture was stirred. The potassium penicillin went into solution, and then rosettes of crystal slowly began to form. The mixture was placed in an ice bath and stirring was continued for one and one half hours. The crystalline material was recovered by filtration, washed with a small amount of water, and dried. A total of 0.962 gms. of erythromycin-penicillin-G salt was obtained. Upon chemical test for erythromycin (test d. above), 780 mcg. of erythromycin per mg. were found. The material so prepared was submitted for test. Upon chemical test for penicillin (test b. above), 442 penicillin units per mg. were found.

*Example IV*

A solution was prepared containing 5 g. of erythromycin hydrochloride (950 mcg./mg.) in 150 ml. of water. To this was added with stirring 2.33 g. of potassium penicillin-G (1587 u/mg.) in finely divided crystalline form. The penicillin went into solution and a white crystalline precipitate of erythromycin-penicillin-G salt began forming immediately. Sample crystals observed under a polarizing microscope showed birefringence and extinction and had the appearance of fan-shaped sprays or clusters of needles. The precipitate was at first of a thick mushy consistency but on stirring for about one hour, some of the salt seemed to go back into solution, and the precipitate took on a silvery cast, but with no apparent change in the crystal pattern. The crystalline salt was recovered by filtration under vacuum, washed with about 10 ml. of water, and dried under vacuum at 45° C.

The crystalline erythromycin-penicillin-G salt thus prepared was assayed by tests set forth above and gave the following results: Chemical test for penicillin (b) showed 483 penicillin units per mg. Chemical test for erythromycin (d) showed 569 mcg. of erythromycin per mg. A solution of 1 mg. of the salt per ml. of acetone was tested by the agar dilution method and showed 50,000–100,000 agar dilution units of activity against *Staphylococcus aureus* and 1000–2000 agar dilution units of activity against *M. tuberculosis*. A corresponding solution of erythromycin hydrochloride tested concurrently by the same procedure showed 8000–9000 agar dilution units of activity against *Staphylococcus aureus*, and 2000–3000 agar dilution units of activity against *M. tuberculosis*.

The crystalline salt was tested for moisture content by the K. Fischer procedure and showed 1.6 percent moisture. Its specific rotation, when tested in a concentration of 5 percent in methanol, was $(\alpha)_{26}\text{-D}-36°$. On determination of the melting point, using a Fischer hot stage melting point apparatus, the crystalline salt slowly turned yellow, melted at about 142 to 147° C., and when melted took on a bright yellow color.

*Example V*

A water solution containing 1.0 g. of potassium penicillin-O is acidified to pH 2.0 using dilute sulfuric acid, and extracted with two 20 ml. portions of ether. The combined ether extracts are added, with stirring, to a solution of 2.0 g. of erythromycin base in 50 ml. of ether. A white precipitate consisting of the erythromycin-penicillin-O salt forms, and is removed by filtration, washed with cold ether, and dried in vacuo.

*Example VI*

Any of the preceding examples can be repeated, save that instead of using the potassium salt of the penicillin, other common soluble salts of penicillin are used, such as the various other alkali metal salts, the ammonium and substituted ammonium salts, etc.

*Example VII*

Examples 1, 4, and 6 can be repeated, save that instead of using penicillin-G, some other penicillin is used, such as penicillin-F, penicillin-dihydro-F, penicillin-X, penicillin-K, and mixtures of penicillins. The erythromycin-penicillin salt produced in each such case contains the corresponding penicillin.

I claim:
1. The erythromycin salt of penicillin.
2. The erythromycin salt of penicillin G.

References Cited in the file of this patent

UNITED STATES PATENTS

| | | |
|---|---|---|
| 2,515,898 | Rhodehamel | July 18, 1950 |
| 2,565,653 | Fried et al. | Aug. 28, 1951 |

OTHER REFERENCES

Science, vol. III, pp. 254–56, Mar. 10, 1950.
Bender et al.: J. A. D. A., pp. 169–174, February 1950.